United States Patent [19]

Petrak

[11] 4,378,868
[45] Apr. 5, 1983

[54] LIVE SPINDLE WHEEL ASSEMBLY WITH TORQUE RESPONSIVE DRIVE ENGAGEMENT MEANS

[75] Inventor: Harry A. Petrak, Boulder, Colo.
[73] Assignee: Tenneco Inc., Bannockburn, Ill.
[21] Appl. No.: 143,197
[22] Filed: Apr. 24, 1980
[51] Int. Cl.³ .................... F16D 11/00; F16D 43/20
[52] U.S. Cl. ...................... 192/93 A; 192/49; 192/54; 192/67 R; 301/132; 403/1
[58] Field of Search ............ 192/54, 93 A, 67 R, 192/49, 50; 403/1; 301/124 H, 126, 132, 135, 6 R; 180/247, 253, 70 R

[56] References Cited

U.S. PATENT DOCUMENTS

| 1,118,874 | 11/1914 | Morgan | 301/126 |
| 2,087,684 | 7/1937 | Alessi-Grimaldi | 301/126 X |
| 3,656,598 | 4/1972 | Goble | 192/67 R X |
| 4,010,986 | 3/1977 | Otto | 308/16 |
| 4,227,599 | 10/1980 | Ishiwata et al. | 192/67 R X |
| 4,238,014 | 12/1980 | Petrak | 192/54 |
| 4,262,785 | 4/1981 | Anderson et al. | 192/54 X |
| 4,273,460 | 6/1981 | Ueno | 403/1 |

*Primary Examiner*—Rodney H. Bonck
*Attorney, Agent, or Firm*—Thomas C. Torphy; James R. Hagen

[57] ABSTRACT

A vehicle wheel assembly of the live spindle type is rendered driven or free wheeling by a torque responsive hub clutch. The hub clutch operates in response to the presence or absence of relative rotary motion between a driveable axle and a passive or stationary member in the wheel assembly.

13 Claims, 9 Drawing Figures

LIVE SPINDLE WHEEL ASSEMBLY WITH TORQUE RESPONSIVE DRIVE ENGAGEMENT MEANS

BACKGROUND OF THE INVENTION

Vehicle wheel assemblies of the live spindle type are currently known to those skilled in the art of vehicle wheel assembly design. U.S. Pat. No. 4,010,986 shows a typical live spindle design in which the spindle is journaled or mounted for rotation in a bore of a mounting component, such as a non-rotating hub, attached to the vehicle. Bearings are interposed between the hub and the spindle. A drive axle is inserted through a central bore or aperture in the spindle. Generally the drive axle is threaded on one end and has a bearing retaining flange adjacent the opposite end and a nut on the threaded end is torqued down sufficiently to maintain the assembled components in the desired relationship and the axle is substantially rigidly affixed to the spindle so that the spindle and axle must rotate together at all times and no axial movement of the axle relative to the spindle is allowed. These typical prior art wheel assemblies of the live spindle type do not permit selective engagement or disengagement of the axle from the spindle and do not permit the use of torque responsive hub clutches for automatically engaging or disengaging the axle from the spindle to be selectively free wheeling or driven relative to the axle.

BRIEF SUMMARY OF THE INVENTION

A vehicle wheel assembly of the live spindle type is provided with a stationary or passive member interposed between a selectively driveable axle and the spindle to enable use of a torque responsive hub clutch to engage or disengage the driven spindle from the driveable axle in response to the presence or absence of relative rotary motion between the stationary member and the driveable axle.

DESCRIPTION OF THE PREFERRED EMBODIMENT

Figure 1:
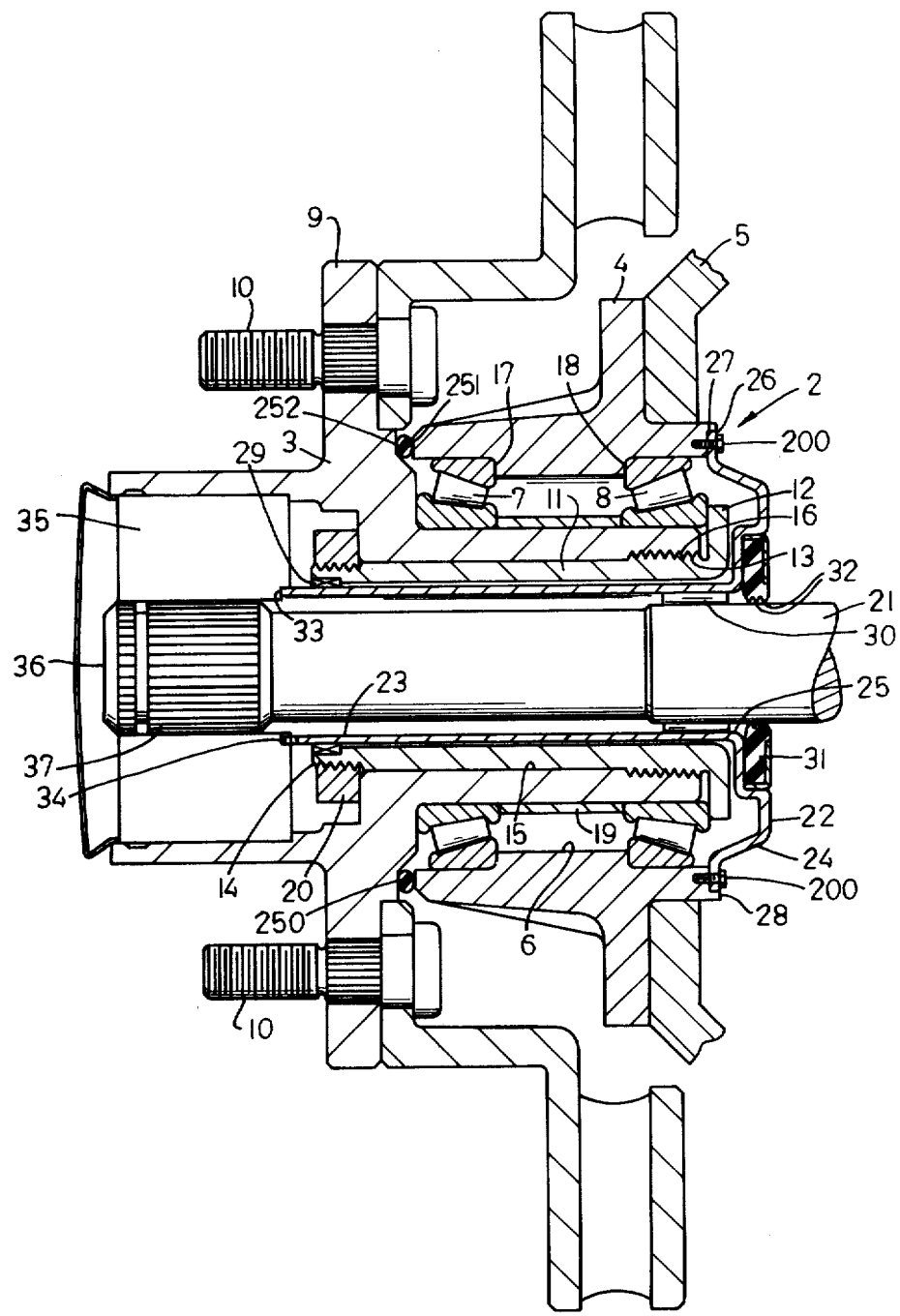
FIG. 1 is a partial cross-sectional view of a vehicle wheel assembly of the live spindle type having a stationary member of this invention.

FIG. 1 shows a partial sectional view of a live spindle vehicle wheel assembly 2 having a live spindle 3, a vehicle mounting component, such as non-rotating hub 4, having attachment means, such as steering knuckle 5, for attaching assembly 2 to appropriate attachment points (not shown) such as the ball joints on a vehicle chassis. The vehicle wheel assembly may be attached to the chassis in an articulated arrangement for steerable wheels or in a relatively rigid non-articulated arrangement for non-steerable or straight tracking wheels wherein attachment means 5 would typically be an upper control arm.

To facilitate description of this invention the term "outboard" shall mean a direction parallel to the longitudinal axis of assembly 2 and away from the vehicle on which the assembly is mounted and "inboard" shall mean a direction parallel to the longitudinal axis of the assembly and toward the vehicle on which the assembly is mounted.

Mounting component 4 has a bore 6 in which spindle 3 is journaled. Friction reducing means, such as tapered roller bearings 7 and 8 are interposed between the bore and the spindle to facilitate rotation of the spindle within the bore 6. Spindle 3 has a wheel mounting flange 9 provided with a plurality of threaded fasteners 10 equally spaced in a circular pattern concentric with the longitudinal axis of the assembly 2. In application a vehicle wheel and tire assembly would normally be mounted on the fasteners 10 and maintained rigidly against the flange by lug nuts.

An assembly maintenance member, such as maintenance tube 11, having a radially outwardly extending flange 12 at a first or inboard end, a first threaded section 13 adjacent flange 12 and a threaded end 14 at a second or outboard end is inserted through a central bore 15 in spindle 3. Flange 12 may be provided with torque means (not shown), such as spaced flats, such as in a hexagonal pattern, or with diametrically opposed axially extending holes, so that a conventional wrench or a spanner wrench, respectively, may be used to engage threaded section 13 with a complementary threaded section 16 provided in the bore 15. Maintenance tube 11 is torqued into threads 16 sufficiently to properly seat bearings 7 and 8 with respect to locating means, such as shoulders 17 and 18, in bore 6 and with respect to spindle 3. A spacer means, such as cylindrical spacer 19, is placed between bearings 7 and 8 to provide proper spacing between the bearings. A nut 20 is engaged with threaded end 14 and when sufficiently tightened nut 20 serves as a lock or anti-loosening means to prevent unintentional loosening of maintenance tube 11 with respect to spindle 3.

A driveable axle 21 is inserted within, is radially inwardly spaced from and extends through maintenance tube 11. Axle 21 would normally be connected to components (not shown), such as universal joints and drive shafts which would comprise a drive train connecting axle 21 to a power source.

Interposed between axle 21 and the internal surface of maintenance tube 11 is a stationary or passive member 22. Stationary member 22 is comprised of an axially extending cylindrical portion 23 which extends axially between axle 21 and maintenance tube 11 and a radially outwardly extending flange 24 shown formed integral with and radially outwardly extending from an inboard end 25 of cylindrical portion 23. Stationary member 22 is rigidly affixed to mounting component 4, such as by having a peripheral portion 26 of flange 24 placed into sealing engagement with an annular shoulder or groove 27 formed in an inboard axially facing end 28 of mounting component 4 and preferably maintained in such engagement by positive engagement means, such as a plurality of threaded fasteners 200.

A bearing means, such as bushing 29, is interposed between cylindrical portion 23 of member 22 and tube 11 to assure that portion 23 maintains a radially spaced relationship between each tube 11 and axle 21. Also, a bearing means, such as needle bearing 30, is interposed between axle 21 and a portion of the internal surface of portion 23 of member 22 to aid in maintaining axle 21 in a spaced relationship with respect to portion 23 of member 22.

A lubricant seal, such as annular resilient seal 31, is preferably fixedly engaged with member 22 and resiliently engaged, such as by annular seal lips 32, with a peripheral portion of axle 21 to maintain lubricant within the assembly and exclude contaminants from the assembly.

Cylindrical portion 23 of member 22 terminates in an outboard end 33 having rotation prevention means, such as a slot 34 engaging a complementary nib of an automatic hub clutch, represented in FIG. 1 by box 35. Detailed disclosure of clutch 35 is provided in FIGS. 3 through 9 and in that portion of the specification which describes those FIGS.

Axle 21 extends axially outboard beyond terminal outboard end 33 of member 23. Adjacent an outboard terminal end 36 of axle 21 a spline 37 is provided for engagement with clutch 35.

Preferably, on annular resilient seal member, such as resilient annular seal 250 is sealingly interposed between an axially outboard facing surface 251 of hub 4 and an axially inboard facing surface 252 of flange 9 to prevent flow of lubricant from the bearings and protect the bearings from particulate matter and contaminants.

Figure 2:
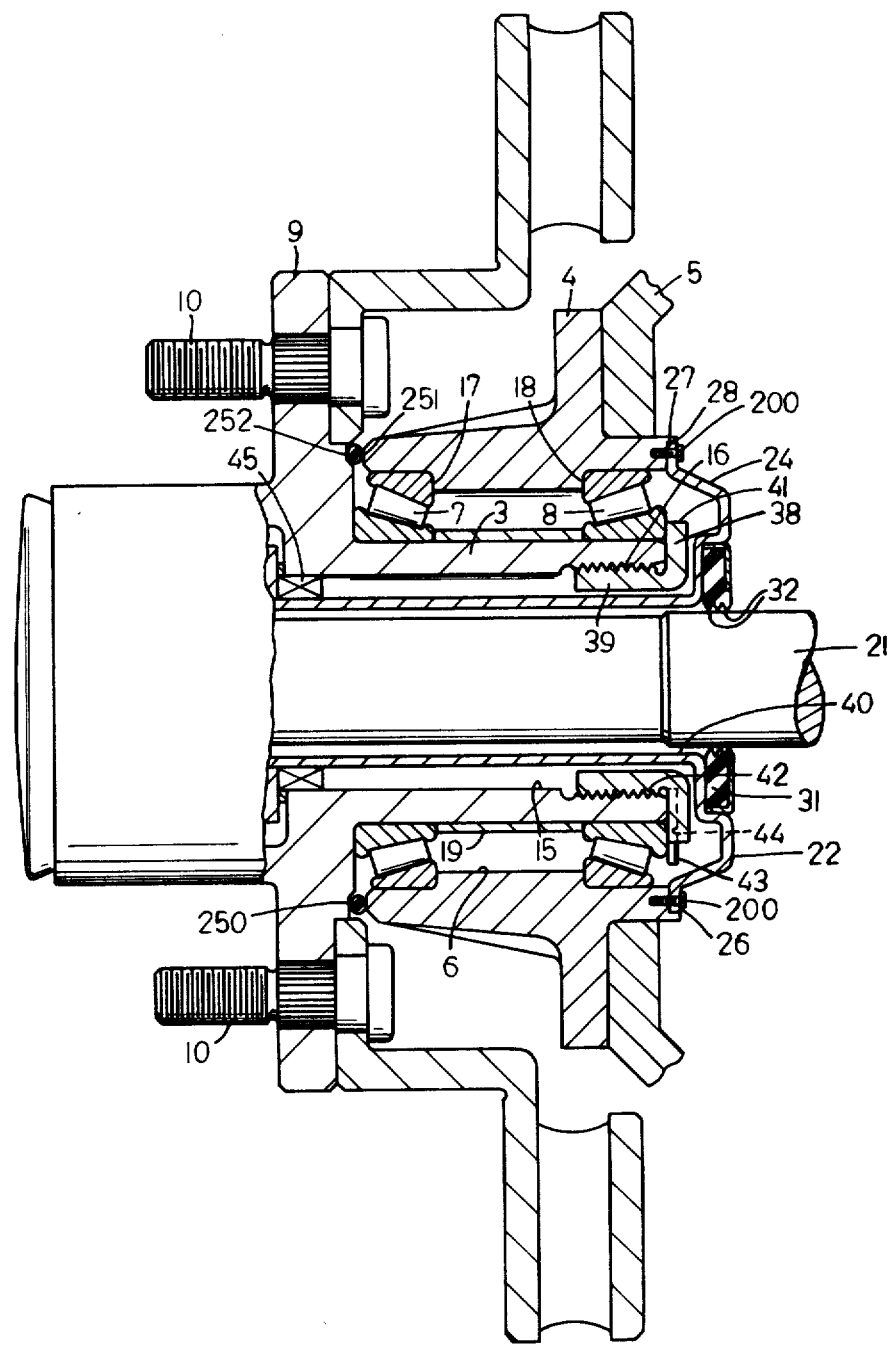
FIG. 2 is a partial cross-sectional view of a vehicle wheel assembly of this live spindle type having an alternate arrangement of a stationary member of this invention.

FIG. 2 shows an alternate form of a vehicle wheel assembly in which the structure of the assembly is substantially identical to that of FIG. 1 except for the assembly maintenance tube.

In the vehicle wheel assembly of FIG. 2 an assembly maintenance tube 38 has a cylindrical portion 39 interposed between a stationary member 40 and spindle 3. Member 38 has a radially outwardly extending flange 41 which engages an inboard axially facing portion of bearing 8.

A threaded portion 42 of tube 38 threadedly engages the threaded portion 16 of spindle 3. Flange 41 is provided with torque imposing means, such as flats or spanner wrench holes, so it can be torqued into the desired engagement with bearing 8 to maintain the assembly. A roll pin 43 is inserted into a radially extending slot or opening 44 in flange 41 and frictionally engages non-rotating portions of the spindle or bearing to serve as a locking device to prevent unintentional loosening of tube 38 from spindle 3.

Guidance and friction reducing means, such as needle bearing 45, is positioned between spindle 3 and stationary member 40 to aid in maintaining member 40 concentric with spindle 3.

Except for the structure of assembly maintenance tube 38 all other structural features and functions of the wheel assembly of FIG. 2 are the same as the wheel assembly of FIG. 1.

Figure 3:
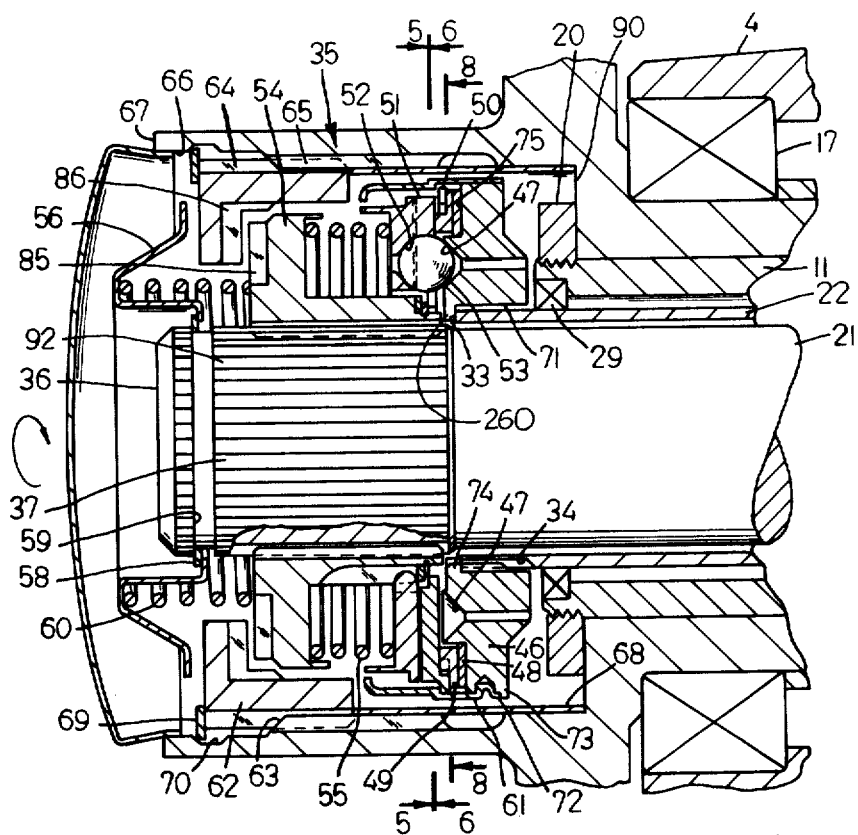
FIG. 3 is a cross-sectional view of a disengaged torque responsive hub clutch placed in the wheel assembly shown in FIG. 1.

Referring to FIG. 3 the hub clutch is comprised of a first actuator means receiving member, such as annular detent ring 46, having a plurality of actuator means receiving means, such as recess or detent 47, a first bearing means 48, a second bearing means 49, an actuator means retaining member 50, a second actuator means receiving member, such as annular cam ring 51, having a plurality of actuator means receiving means, such as recess or detent 52, a plurality of actuator means, such as ball 53, and a drive gear 54 engaged to spline 37 to enable drive gear 54 to move axially relative to axle 21 and to prevent relative rotary motion between axle 21 and drive gear 54. A first resilient biasing means, such as helical spring 55, is interposed between the drive gear 54 and the cam ring 51.

A retention means, such as annular spring retainer cup 56, is mounted on axle 21 and maintained substantially coaxial with axle 21 and in an axial spaced relationship to a terminal outboard end 36 of axle 21 by appropriate means, such as a snap ring 58, engaged with an annular groove 59 in axle 21.

A second resilient biasing means, such as coil spring 60, is interposed between the retainer cup 56 and drive gear 54.

A substantially cylindrical member, such as shell 61, surrounds a substantial axial portion of the hub clutch assembly.

A ring gear 62 is affixed to a radially inner surface 63 of spindle 3 by appropriate means, such as radially outwardly extending projections 64 on ring gear 62 which extend into complementary radially outwardly extending spaces 65 formed on spindle 3 to prevent relative rotary motion between ring gear 62 and spindle 3 and to enable the ring gear to be axially slid into the spindle 3 through an opening 66 at an outboard end 67 of spindle 3 and be therein axially affixed.

A spacer means, such as substantially cylindrical spacer tube 68, maintains the ring gear in an axial spaced relationship with a shoulder 90 and appropriate retention means, such as spring type retaining ring 69 in annular groove 70, maintains the ring gear in a desired axial position within the hub.

As shown in FIG. 3, annular detent ring 46 has a radially inwardly facing surface 71 defining a central opening in ring 46, a radially outwardly facing surface 72 coaxial with and radially outwardly spaced from surface 71 and a web 73 extending between surface 71 and surface 72. A key nib 74, also shown in FIG. 5, extends radially inwardly from a portion of surface 71. The central opening defined by surface 71 is appropriately sized to receive end 33 of stationary member 22 and key nib 74 is appropriately sized to be received by keyway 34 formed in member 22. When detent ring 46 is mounted on the stationary member 22 the radially inwardly extending flange 260 on detent ring 46 limits axial inboard movement of the detent ring concentric with the spindle 3 and key nib 74 within keyway 34 prevents rotary movement of detent ring 46 relative to stationary member 22.

Figure 4:
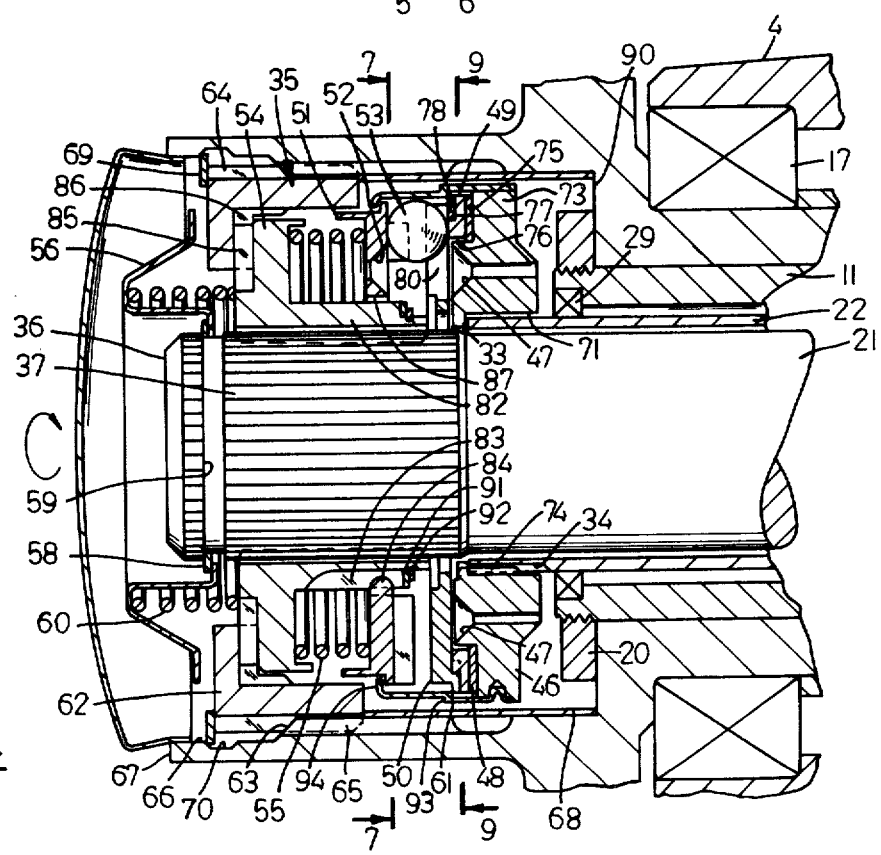
FIG. 4 is a cross-sectional view of the torque responsive hub clutch of FIG. 3 shown in the engaged position.

Referring to FIG. 4, a first bearing means 48 is an annular ring which rests on an axially outboard facing surface 75 of detent ring 46, is concentrically mounted on detent ring 46 relative to surface 71 and maintained in that concentric relationship by a radially outwardly facing axially outboard extending shoulder surface 76 on web 73. While bearing means 48 may be comprised of a large variety of friction reducing materials or various designs of bearing devices, it is preferably formed of oil impregnated sintered bronze.

A second bearing means 49 is also a substantially annular ring concentrically mounted on detent ring 46 relative to surface 71 and it also is maintained in that concentric relationship by the shoulder surface 76 on detent ring 46.

Second bearing means 49 is preferably formed of a material highly resistant to wear, such as hardened steel, as an axially inboard facing surface of bearing 49 is subjected to surface contact and sliding travel over the outboard facing surface of bearing 48. Bearing 49 has an axially outboard extending shoulder 77 having a plurality of radially extending nibs 78 formed on it. Shoulder 77 and nibs 78 are more clearly shown in FIGS. 5, 8 and 9.

Figure 5:
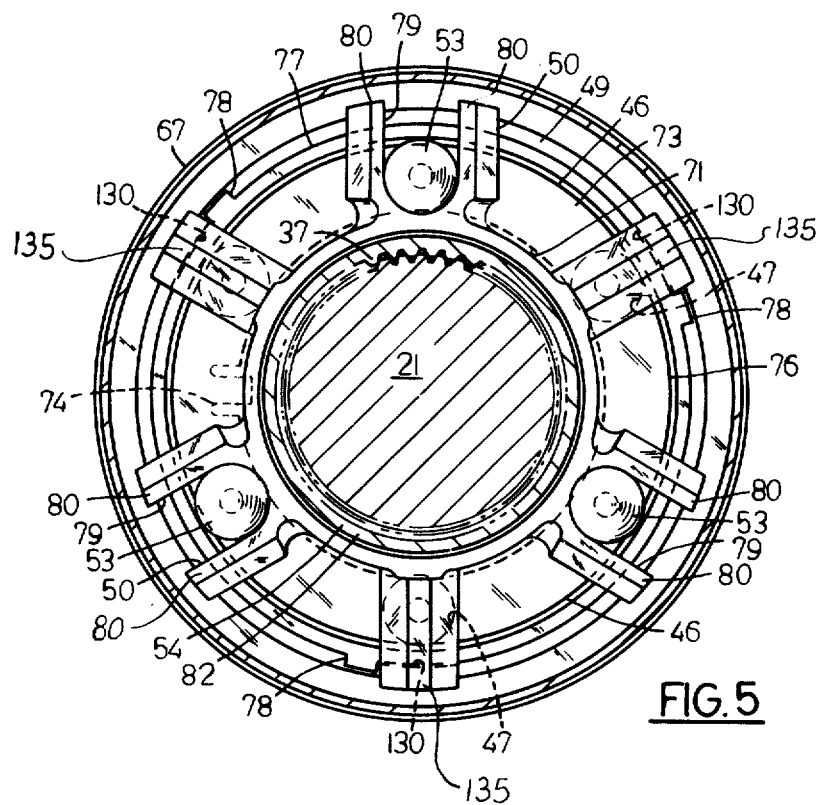
FIG. 5 is a full-sectional view of the clutch shown in FIG. 3, as indicated by the section line on FIG. 3.
Figure 8:
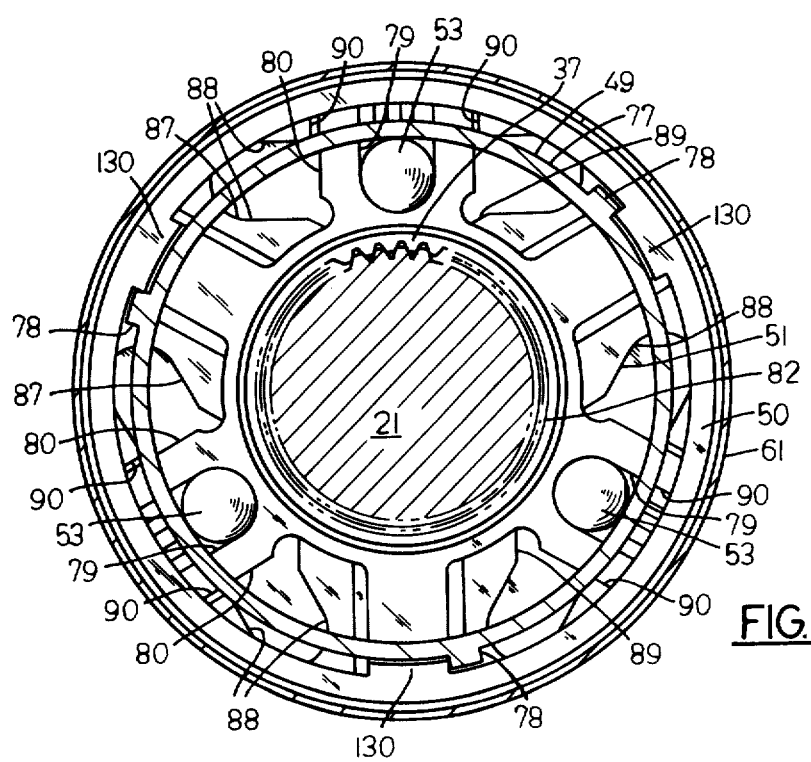
FIG. 8 is a full-sectional view of FIG. 3, as indicated by the section line on FIG. 3.
Figure 9:
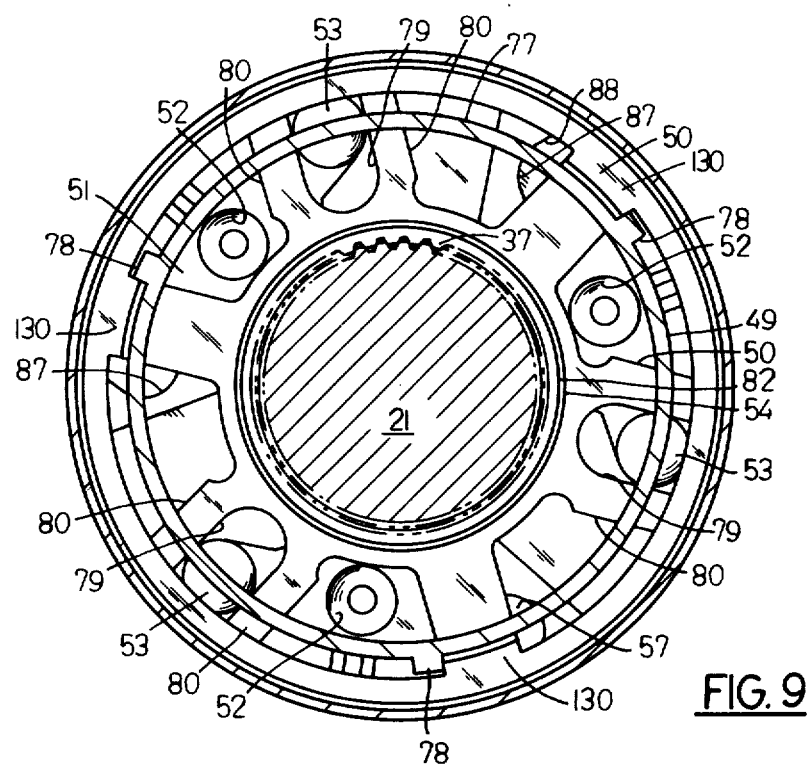
FIG. 9 is a full-sectional view of FIG. 4, as indicated by the section line on FIG. 4.

Referring to FIG. 5, the actuator means retaining member or ball retainer 50 is essentially a ball cage having a plurality, in this case three, of radially elongated ball retaining slots 79. Each slot 79 is appropriately sized relative to an actuator means, such as a ball 53, to confine the ball laterally, but enable it a limited amount of movement radially outwardly when the clutch is disengaged as shown in FIGS. 5 and 8 and a limited amount of movement radially inwardly when the clutch is engaged, as shown in FIG. 9. Retainer 50 has a plurality of radially inwardly extending nibs 130 positioned to engage nibs 78 on bearing 49 and, preferably, support members, such as support nibs 135.

As shown in FIGS. 4 and 5, each ball retaining slot has an axially outboard extending wall 80 formed along each of its sides to aid in assuring that each of the balls 53 remains caged or restrained within its slot.

Detents 47 formed in detent ring 46 are arranged in an equally circular pattern concentric about surface 71 of the detent ring. As shown in FIG. 5, the detents are arranged in an alignable relationship with the balls 53 when they are in their radially innermost position in slots 79 whereby when one ball 53 is aligned for being received within a detent each of the other balls is also aligned for being received within a detent. In the preferred embodiment shown six equally spaced detents are provided to reduce the amount of arcuate travel or rotary motion required by retainer 50 and each ball before the ball is aligned for reception by a detent.

Figure 6:
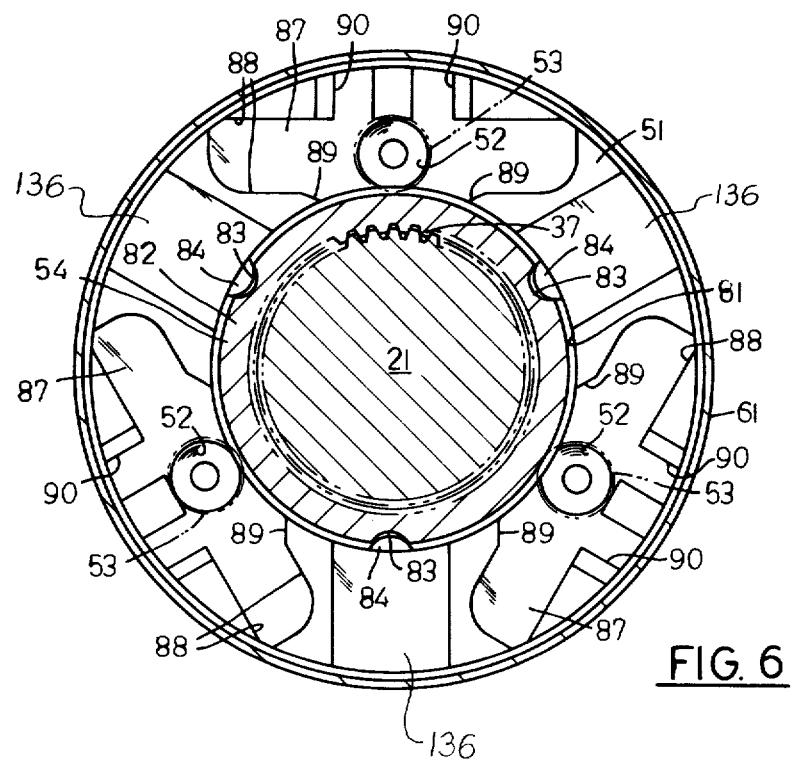
FIG. 6 is a full-sectional view of the clutch shown in FIG. 3, as indicated by the section line on FIG. 3.

FIG. 6, as indicated by the section line on FIG. 3, shows the axially inboard facing face of cam ring 51. Ring 51 is a substantially annular ring having a radially inwardly facing surface 81 defining an opening appropriately sized to receive a substantially cylindrical portion 82 of drive gear 54. Three equally spaced axially elongated radially inwardly extending slots 83 are formed in cylindrical portion 82 of drive gear 54 and three radially inwardly extending projections 84 are equally spaced and rigidly positioned on surface 81 of cam ring 51. As shown, by virtue of the projections 84 extending into slots 83, relative axial movement between cam ring 81 and drive gear 54 is permitted while relative rotational movement between cam ring 51 and drive gear 54 is prevented.

As previously stated, drive gear 54 is capable of axial movement along outboard end portion 92 of axle 21 and forced to rotate when the axle rotates due to spline 37 on the axle and therefore, when axle 21 is forced to rotate, drive gear 54 and cam ring 51 are forced to rotate with it.

Cam ring 51 is provided with three equally radially spaced ball receiving detents 52. The detents 52 are alignable with slots 79 in ball retainer 50 and with detents 47 in detent ring 46 whereby when each of the balls 53 is in substantially its radially innermost position within a slot 79 each of the balls 53 is aligned for being receivable within a detent 47 in detent ring 46 and with a detent 52 in cam ring 51 and drive gear 54 are at their innermost inboard position, cam ring 51 and detent ring 46 are axially relatively close to each other and the axially outboard facing gear teeth 85 on drive gear 54 are disengaged from the axially inboard facing gear teeth 86 on ring gear 62 whereby the spindle 3 is disengaged from axle 21 and consequently free to rotate or free-wheel in mounting component 4.

Again referring to cam ring 51 as shown in FIG. 6, each of the detents 52 is positioned in the center of a slot 87 defined by axially inboard extending walls 88. On each of two lateral sides of each detent 52 a ball ramp 89 is formed by the slot defining wall 88 of each slot 87.

Figure 7:
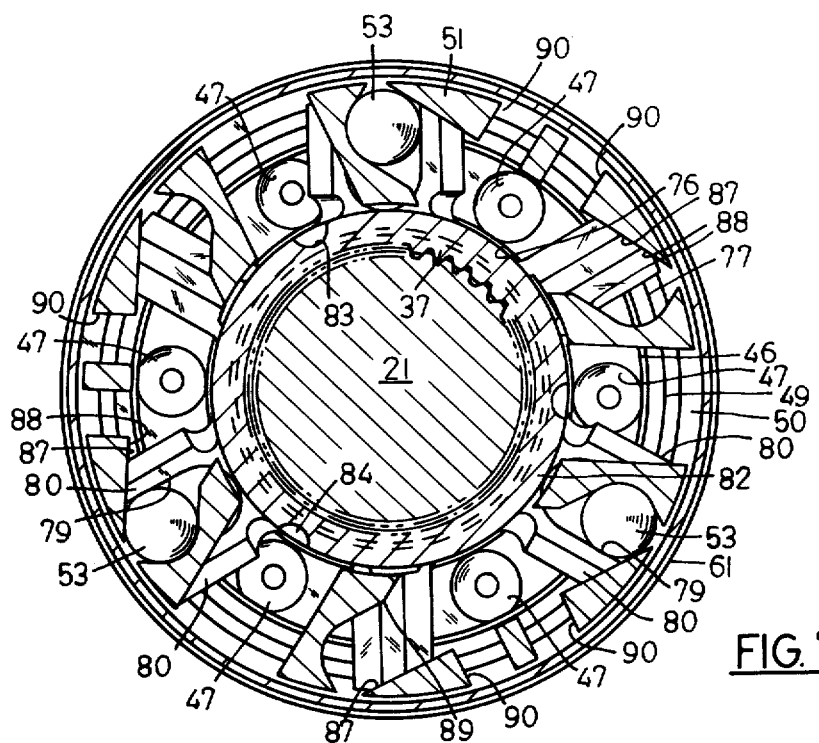
FIG. 7 is a full-sectional view of the clutch shown in FIG. 4, as indicated by the section line on FIG. 4.

As more clearly shown in FIG. 7, a pair of substantially parallel substantially radially extending slots 90 are formed radially outwardly from each slot 87. Also, slots 136 are provided between slots 87 to receive axially extending wall portions of a plurality of support nibs 135 on ball retainer 50. Slots 90 are spaced to receive outboardly extending ball retention walls 80 on ball retainer 50 when the clutch is in the disengaged position shown in FIG. 3. By virtue of the axially extending walls 80 and support nibs 135 fitting into slots 90 and 136 respectively the outboard facing position of ball retainer 50 and the inboard facing portion of cam ring 51 intermesh to assure entrapment and retention of the balls within the slots 79 and detents 47 and 52 when the clutch is in the disengaged position. More importantly, by intermeshing the facing surfaces of the cam ring and the ball retainer the walls 80 of the ball retainer can be made higher, i.e. more axially extending, and therefore the balls are assured of remaining properly confined when they travel from a disengaged to an engaged position and vice versa.

As shown in FIG. 4, a washer 91 and snap ring 92 are mounted adjacent the inboard end of the cylindrical portion 82 of drive gear 54 to maintain the drive gear, spring and cam ring as a subassembly.

As shown in FIG. 4, cylindrical shell 61 encircles detent ring 46 and extends axially outboard. Shell 61 is rigidly affixed to detent ring 46 and thereby restrained from axial or rotary movement. Shell 61 has a first radially inwardly extending flange 93 and a second radially inwardly extending flange 94.

Flange 93 serves to maintain bearing 48, bearing 49 and ball retainer 50 axially entrapped between it and the outboard facing surface of cam ring 46 which the inboard facing surface of bearing 48 contacts. Flange 94 serves to limit axial outboard movement of cam ring 51 away from ball retainer 50 and detent ring 46 and thus serves to insure that the balls 53 will remain entrapped within the confines of cam ring walls 88 and ball retainer slot walls 80.

Shell 61 also maintains drive gear 54, spring 55, cam ring 21, balls 53, ball retainer 50, bearing 49, bearing 48 and detent ring 46 as an assembled unit which only needs to have key nib 74 aligned with keyway 45 and the spline on the drive gear aligned with the spline on the axle to be slid axially inboard into operative position in a wheel hub assembly.

Operation of the hub clutch is as follows. Referring to FIG. 3, in which the spindle 3 is shown disengaged from axle 21 because the drive gear is disengaged from the ring gear, the clutch will remain substantially in the position shown as long as no torque is applied to axle 21. Therefore, spindle 3 and with it ring gear 62 and spacer tube 68, will free-wheel within mounting component 4 and about the other clutch components, axle 21 and member 22.

When the drive train to axle 21 is placed in the engaged or driving mode the axle commences to rotate about its longitudinal axis and cam ring 51, both springs 55 and 60, spring return cup 56 and drive gear 54 commence to rotate along with it.

As detent ring 46 is prevented from rotation because key nib 74 is positioned in keyway 34 it does not rotate, nor does shell 61. Upon rotation of cam ring 51 each ball 53 is forced to move out of detents 52 and/or detents 47. The balls may move out of one set of detents first and then the other set of detents or they move out of both sets of detents simultaneously. Whatever they do, they are forced to do it simultaneously because they are confined to equally spaced positions by the slots in ball retainer 50. The balls are rapidly forced to move out of both sets of detents upon rotation of the cam ring.

Referring to FIG. 7, as the balls move out of the cam detents they move axially with respect to the detents and through a short arc and encounter ball ramps 89 formed by slot walls 88 which define slots 87. Each ball ramp simultaneously urges each ball radially outwardly along slot walls 88 until they reach the position shown in FIG. 7 whereby they are restrained from further radially outward movement by slot walls 88. As the balls move radially outwardly along slot walls 88 they simultaneously move radially outwardly in slot 79 of ball retainer 50 until they reach the radial outermost position shown in FIG. 9.

Referring to FIG. 4, it will be seen that the balls 53, upon being forced out of detents 47 and 52 force drive gear 54, via spring 55 and cam ring 51 axially outboardly whereby cam ring 51 and detent ring 46 are relatively axially distant from each other and teeth 85 on drive gear 54 are forced into meshing engagement with teeth 86 and ring gear 62. Consequently, torque is then transmitted from the axle 21 through the drive gear to the ring gear affixed to the hub to render the hub a driven or powered hub.

Spring 55 is interposed between the cam ring 51 and drive gear 54 to prevent component breakage in the event the gear teeth 85 and 86 are not aligned for meshing as the balls force the drive gear toward the ring gear. The spring enables the cam ring to move axially outboardly separate from the drive gear in response to the force of the balls if the crests of the teeth try to engage each other. The spring also resiliently urges the drive gear teeth into meshing engagement with the ring gear teeth as soon as the teeth crest are forced out of direct interference with each other.

In FIG. 4, it can be seen that the balls are confined between bearing 49 and an axially inboard facing surface of slot 87. Also the balls are prevented from moving out of slot 87 by the axially inboard extending slot defining walls 88 and they are prevented from moving out of ball retainer slot 79 by the axially outboard extending walls 80. Therefore, the balls will remain in the position shown in FIGS. 4, 7 and 9 as long as the axle 21 remains in the driving mode and is driven in the same direction which impelled the balls into their radially outermost position. Thus, the teeth of the drive gear remain meshed with the teeth of the ring gear and the hub remains driven by the axle.

In the position shown in FIG. 4 each ball orbits about the longitudinal axis of the torque responsive assembly but they do not rotate about their own center.

Rather, rotation of each ball about its own center is generally non-existent because the radially inwardly extending nibs 130 on ball retainer 50, as shown in FIG. 8, rotate along with ball retainer 50 as the balls are forced out to their radially outermost position. Each of the nibs 130, after rotation of ball retainer 50 through a short arc, engage a radially outwardly projecting nib on bearing 49 and due to this engagement bearing 49 is forced to rotate along with the ball retainer 50, the balls 53 and the other rotating components of the hub clutch, as described above.

Due to the forced rotation of bearing 49 relative rotational movement is forced to occur between bearing 49 and the axially outboardly facing surface of bearing 48 and/or between the axially inboard facing surface of bearing 48 and the axially outboard facing surface of detent ring 46 with which bearing 48 interfaces.

Functionally, it is immaterial which surface or surfaces slide with respect to the other as the lubricant impregnated bearing 48 has substantially identical anti-friction properties on each of its axial outboard facing and axial inboard facing sides. However, as a matter of common sense manufacturing economics, it appears preferable to have bearing 48 remain stationary as this precludes the necessity of having a finely ground surface on detent ring 46 over which bearing 48 can slide.

When it is desired to disengage the axle from the transmission to place the axle 21 in its passive or non-driven mode the wheel hub is rotated in a direction opposite to that in which it was driven in the four wheel drive mode. Assuming the vehicle was being driven forward in four wheel drive, disengagement of the axle from the hub is accomplished by disengaging the drive axle drive train from the transmission and backing the vehicle up a short distance, such as ¼ to ⅓ of a wheel revolution, in two wheel drive. Alternately, the vehicle may be backed up a short distance in four wheel drive, the four wheel drive train can then be disengaged, and the drive gear will be disengaged from the ring gear when the vehicle is driven forward.

Rotation of the spindle in the opposite direction when the axle is not driven causes each ball to rotate about its center because each ball has less resistance to roll about its center than the resistance bearing 49 has to rotate with respect to detent ring 46 due to the presence of sliding friction between the bearing 49 and the detent ring via bearing 48.

Each ball, urged by the camming force of slot walls 88, thus rolls off bearing 49, all the balls moving simultaneously due to being caged in ball retainer 50, and, traveling along an arcuate path with a diminishing radius, move radially inwardly to the radially innermost position in ball retainer slots 79 to be alignable for reception in a detent 52 in the substantial center of each slot 87 in cam ring 51 and a detent 47 in detent ring 46 and the drive gear is simultaneously forced axially inboard by the resilient urging of spring 60 to assure that the drive gear and cam ring are urged axially inboard as a substantially rigid unit to assure that each actuator ball ends up in a detent 47 and a detent 52 and remains there.

If the vehicle is driven in four wheel drive and the direction of drive is reversed the balls are forced or cammed by slot walls 88 to roll radially inwardly. The ball retainer 50 rotates through a short arc, such as 80 to 90 degrees, while the balls go into detents, are immediately forced out and go to the opposite end of the slot. The balls again end up at a radially outermost position between cam ring 51 and bearing 49, the radially inwardly projecting nibs 130 on ball retainer 50 again engage the radially outwardly projecting nibs on bearing 49 and the balls once again orbit about the axis of spindle 3, but not about their own centers, and the drive gear is drivingly engaged with the ring gear. During such reversals of direction of the vehicle in four wheel drive the clutch disengages and substantially immediately reengages the drive gear with the ring gear to provide a substantial continuity of driving force to the spindle.

This invention is applicable to any vehicle wheel, steerable or straight tracking, having a selectively driveable axle and being of the live spindle type.

As the axle is axially slideable with respect to the ring gear which drives the spindle the wheel assembly disclosed herein also enables relief of stresses imposed on the drive train which drives the axle as the wheel assembly moves with respect to the power source which drives the axle. This feature is particularly beneficial for wheel assemblies on vehicles having independent suspension.

I claim:

1. In a wheel assembly having a live spindle, said spindle having a central aperture and said spindle being mounted for rotation in a bore of a mounting member, a drive axle extending into said aperture in said spindle, wherein the improvement comprises:
   a substantially annular space between said drive axle and a surface defining said central aperture in said spindle;
   a passive member within said annular space and in a radially spaced relationship from each said aperture defining surface and said axle and means for preventing said passive member from rotating; and
   clutch means engaged with said passive member and said axle whereby when said axle is forced to rotate said clutch means is operated.

2. The invention as defined in claim 1 in which said clutch means is a torque responsive hub clutch.

3. The invention as defined in claim 1 in which said passive member is comprised of a tubular portion and a flange portion and said tubular portion is interposed between said spindle and said axle within said annular space and said flange portion is affixed to said tubular portion and extends radially outwardly and is affixed to said mounting member.

4. The invention as defined in claim 1 together with a lubricant seal sealingly affixed to said passive member and resiliently sealingly engaged with a continuous substantially annular portion of said axle for preventing fluid flow out of said assembly between said passive member and said axle.

5. The invention as defined in claim 1 in which said spindle is maintained in said bore of said mounting member by an assembly maintenance member having a tubular portion having a central aperture and said annular space is formed between said surface defining said central aperture in said tubular portion of said assembly maintenance member and said axle.

6. The invention as defined in claim 1 together with bearing means interposed between said passive member and said axle for aiding in maintaining said axle coaxial with said passive means.

7. The invention as defined in claim 1 together with bearing means interposed between said passive member and said spindle for aiding in maintaining said spindle and said passive member coaxial.

8. In a vehicle wheel assembly having a mounting member affixable to a portion of a vehicle, said mounting member having a bore, a live spindle mounted for rotation in said bore of said mounting member, said live spindle having a central aperture, the improvement comprising, in combination:
   spindle drive means affixed to said live spindle;
   assembly maintenance means in said central aperture of said live spindle, said assembly maintenance means having a central aperture;
   passive means fixedly engaged with said mounting member and extending axially through said central aperture in said assembly maintenance means, said passive means being radially inwardly spaced from said central aperture in said assembly maintenance means and said passive means having a central aperture;
   a drive axle extending through said central aperture in said passive means, said drive axle being radially inwardly spaced from said central aperture in said passive means; and
   torque responsive clutch means having a first actuating means non-rotatably engaged to said passive means and a second actuating means having a drive means drivingly engaged with said drive axle whereby when torque is applied to said drive axle said clutch means causes said means of said second actuating means to drivingly engage said spindle drive means for rendering said live spindle a driven live spindle.

9. The invention as defined in claim 8 in which said passive means is comprised of a tube interposed between said assembly maintenance means and said axle.

10. The invention as defined in claim 9 in which said tube extends axially beyond an axial end of said spindle and a radially outwardly extending member is affixed to a portion of said tube which is positioned axially beyond said spindle and said radially outwardly extending member is affixed to said mounting member for rendering said tube stationary.

11. The invention as defined in claim 9 in which a bearing means is interposed between said tube and said axle for facilitating rotation of said axle relative to said tube and for maintaining said tube and said axle in a coaxial relationship.

12. The invention as defined in claim 9 in which a bearing means is interposed between said assembly maintenance means and said tube for facilitating rotation of said assembly maintenance means relative to said tube and for maintaining said tube and said assembly maintenance means in a coaxial relationship.

13. The invention as defined in claim 9 in which a bearing means is interposed between said spindle and said tube for facilitating rotation of said spindle relative to said tube and for maintaining said tube and said spindle in a coaxial relationship.

* * * * *